United States Patent [19]

Heisner

[11] 3,786,238

[45] Jan. 15, 1974

[54] OPTICAL READER

[75] Inventor: Donald N. Heisner, Mentor, Ohio

[73] Assignee: Addressograph-Multigraph Corporation, Cleveland, Ohio

[22] Filed: Sept. 5, 1972

[21] Appl. No.: 286,379

[52] U.S. Cl. ..... 235/61.11 E, 250/227, 235/61.7 B, 340/149 A

[51] Int. Cl. .......................... G02b 5/14, G06k 7/10

[58] Field of Search ................. 235/61.11 E, 61.7 B; 250/219 D, 219 DC, 227; 340/149 A

[56] References Cited

UNITED STATES PATENTS

| | | | |
|---|---|---|---|
| 3,706,874 | 12/1972 | Lockard | 235/61.11 E |
| 3,629,835 | 12/1971 | Brown et al. | 235/61.11 E |

*Primary Examiner*—Thomas A. Robinson
*Attorney*—Ray S. Pyle

[57] ABSTRACT

An optical information recognition system for sensing information carried on an information carrying member having an information carrying surface exhibiting a normal surface level and having information carried thereon as raised surface areas. The reader includes light transmitting means, such as an array of fiber optic tubes, for transmitting light along a given acute angle of incidence relative to the member so as to illuminate a portion thereof. Light receiving means, such as an array of fiber optic tubes leading to one or more light sensors, serves to receive light reflected from the member and to provide an output indication only when the amount of received light exceeds a given level. This is accomplished by positioning the light receiving means relative to the light transmitting means and the information carrying member so that the given amount of light is received only when a raised surface area is illuminated by the light transmitting means.

5 Claims, 4 Drawing Figures

OPTICAL READER

BACKGROUND OF THE INVENTION

This invention relates to the art of optical readers and, more particularly, to an improved system for recognizing information carried in the form of raised surface areas on an information carrying member.

The invention is particularly applicable in conjunction with optically reading raised surface areas such as embossed portions of a relatively flat information carrying member such as a plastic card, and will be described with particular reference thereto; although it is to be appreciated that the invention may be applied to recognizing raised surface areas on other types of flat information carrying members as well as rotatable discs and rotatable drums.

Cards frequently carry information thereon to be extracted and processed, as with the use of a digital computer. Typically, the information is coded in digital format. The coded information may be stored and retrieved with magnetic or optical systems. For example, in a magnetic system a special strip of magnetic material may be secured to the card and magnetized portions thereof are sensed and decoded. Optical systems employ codes which are made up of a pattern of optical marks in the form of light reflective and nonreflective code areas. These coees are of different forms, such as the bar code, mark read code, computer ones code and the Hollerith code. In both the optical and magnetic systems discussed above, a special code format, such as a strip of magnetic material or a series of punched out coded areas, and the like, is required. Consequently, these forms of storing data on a card detract from the appearance thereof, and require that ample space be provided to carry the coded information.

SUMMARY OF THE INVENTION

The present invention contemplates that the information carrying member carry information thereon in the form of raised surface areas, such as embossed characters. These characters may then be read optically by transmitting light so as to be reflected from the information carrying surface of the member with only the light reflected from a raised surface area being received by the light sensor, such as a photocell or phototransistor.

In accordance with the present invention, light transmitting means, such as an array of fiber optic tubes, serve to transmit light along a given acute angle of incidence relative to the upper surface of an information carrying member so as to illuminate a given portion thereof and be reflected therefrom. Light receiving means, which may include an array of fiber optic tubes together with a phototransistor or the like, serves to provide an output indication when the amount of light received exceeds a particular level. The receiving means is positioned relative to the transmitting means and the upper surface of the information carrying member so that the given level of light is received only when a raised surface area is illuminated.

In accordance with a more limited aspect of the present invention, the light receiving means includes light conveying means, such as fiber optic tubes, which have one end aligned for receiving reflected light and conveying the light to an opposite end position at a remote location from the information carrying member.

The primary object of the present invention is to provide an improved optical reading system for detecting information carried on raised surface area portions on an information carrying member.

A still further object of the present invention is to provide an optical reading system which may be employed to directly read raised information, such as embossed characters or the like, on the face of an information carrying member.

A still further object of the present invention is to provide an improved optical reading system which does not require the use of special codes, strips or holes, or the like.

The foregoing and other objects and advantages of the invention will be more readily appreciated from the following description of the preferred embodiment of the invention taken in conjunction with the accompanying drawings.

IN THE DRAWINGS

DESCRIPTION OF THE PREFERRED EMBODIMENT

Figure 1:
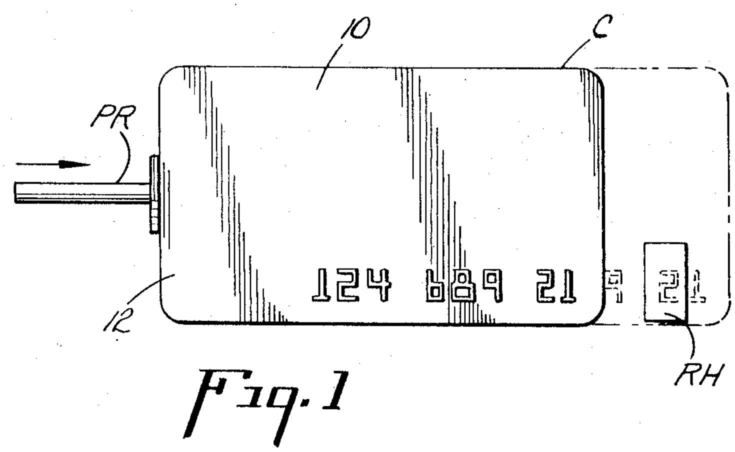
FIG. 1 is an illustration of an information carrying member having embossed characters thereon.

Referring now to the drawings wherein the showings are for purposes of illustrating the preferred embodiment of the invention only and not for purposes of limiting same, FIG. 1 illustrates an information carrying member in the form of a flat card C, which may be made of any suitable material, such as plastic or metal. The upper surface 10 of the card may be light reflective. Card C is shown as carrying data information in the form of a pattern of numerical characters 12. This pattern of numerical characters may, for example, be indicative of the owner of the card to be extracted for billing purposes. As shown, the numerical pattern 12 includes numerical characters arranged in a sequence, 1, 2, 4 - 6, 8, 9 - 2,1. Preferably, each character in the character pattern 12 is formed by a raised surface area on the upper surface 10 of the card. This may be accomplished in various ways, and preferably by embossing. Although the information carried by card C is in the form of numerical characters it is contemplated, in accordance with the invention, that the characters may be other than numerical, and, indeed, the information may be in the form of coded patterns of raised portions on surface 10. The description herein, however, is given with respect to numerical characters.

It is contemplated that the information carried by card C be read as with a read head RH. The read head may be displaced longitudinally along the length of the card to read each character in sequence or, for example, the read head may be held stationary and card C may be displaced, as with a push rod PR, in such a manner that the characters are sequentially read by the read head. The character recognition technique itself and circuitry employed therefor may be conventional.

For example, each character may be recognized by monitoring five aligned and equidistant spaced apart portions of a character area for the presence of a portion making up the character. A read head for this purpose would employ five sensors. For purposes of illustration only, the read head described herein utilizes five sensors for character recognition purposes.

Figure 2:
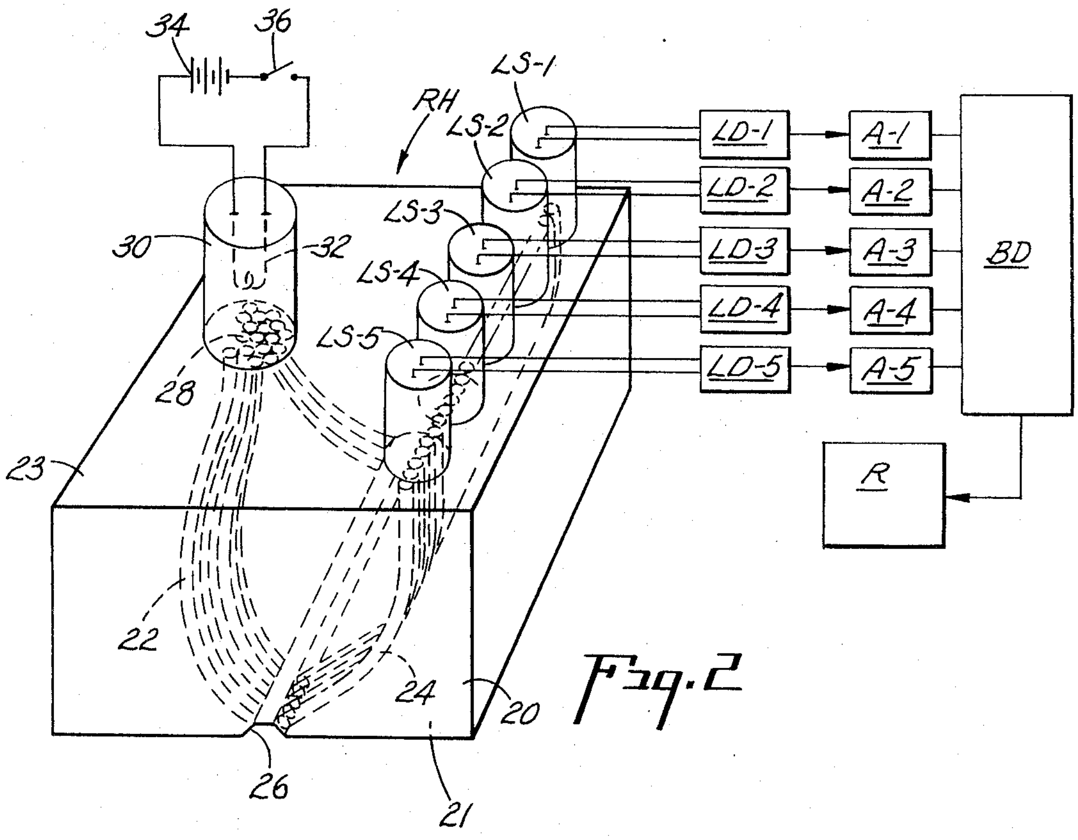
FIG. 2 is a simplified perspective illustration of a read head embodying the present invention.

The read head RH, as shown in FIG. 2, includes a support 20 which serves to support an array 22 of light transmitting fiber optic tubes and an array 24 of light receiving fiber optic tubes. The fiber optic tubes of array 22 have their card facing ends 26 aligned in uniformly spaced relationship so as to extend longitudinally across the card facing surface 21 of support 20. The card facing ends 26 are polished and the tubes extend inwardly through support 20 and are bundled at their opposite ends where they terminate at the upper surface 23 of support 20. A tubular sleeve 30 is secured to the upper surface 23 of support 20 so as to be in registry with the bundled tube ends 28 of array 22. Suitably mounted within sleeve 30 there is provided a light source, in the form of a conventional lamp filament 32, which may be energized from a battery 34 upon closure of a switch 36. The card facing ends 26 of array 22 are aligned and angled so that upon energization of light filament 32 an elongated, laterally extending, continuous beam of light will impinge upon the upper surface 10 of a card being examined. This beam of light should be at least as long as the longest or highest character to be examined.

Array 24 is also carried by support 20, as shown in FIG. 2. Like array 22, each of the fiber optic tubes of array 24 has its card facing end located so as to be exposed through the lower surface 21 of support 20, with the card facing ends being polished. The card facing ends are uniformly spaced and aligned so as to extend longitudinally and parallel to the card facing ends of the tubes in array 22. Unlike array 22, however, the fiber optic tubes of array 24 are arranged coherently through support 20 from the card facing ends to the opposite end thereof. The opposite ends terminate in the upper surface of support 20 and are aligned so as to be exposed to a plurality of light sensors to be described below.

The card facing ends of arrays 22 and 24 are spaced apart from each other and are angled by like amounts so that the angle of incidence is equal to the angle of reflection. For example, the card facing ends of array 22 may be angled at 45° with respect to the lower surface 21 and, if so, the card facing ends of array 24 are angled at 45°. Whereas various materials may be used for support 20 it is preferred that this support be made of a plastic material so that the plastic material may be molded about preassembled arrays 22 and 24.

The upper ends of the tubes in array 24 are coherently aligned longitudinally along the upper surface 23 of support 20 and are exposed to longitudinally spaced light sensors LS-1, LS-2, LS-3, LS-4 and LS-5. Each light sensor serves to sense light transmitted thereto through selected ones of the fiber optic tubes of array 24. These light sensors may take various forms for sensing the amount of light received and, for example, may take the form of phototransistors. Each such phototransistor may be associated with a different character area being monitored. Preferably, the sensors operate to provide output signals indicative of light received or no light received. However, it is conceivable that a relatively low amount of light may be received by a sensor which should not be indicative of a light received condition. If so, then the outputs of the light sensors may be applied to light level detectors LD-1 through LD-5, respectively, to, in effect, filter out the undesired low level condition. The outputs of the level detectors may be amplified, if desired, as with amplifiers A-1 through A-5, respectively, and applied to a suitable binary decoder BD which serves to decode the binary level signals in accordance with a truth table for application to a suitable readout R.

Figure 3:
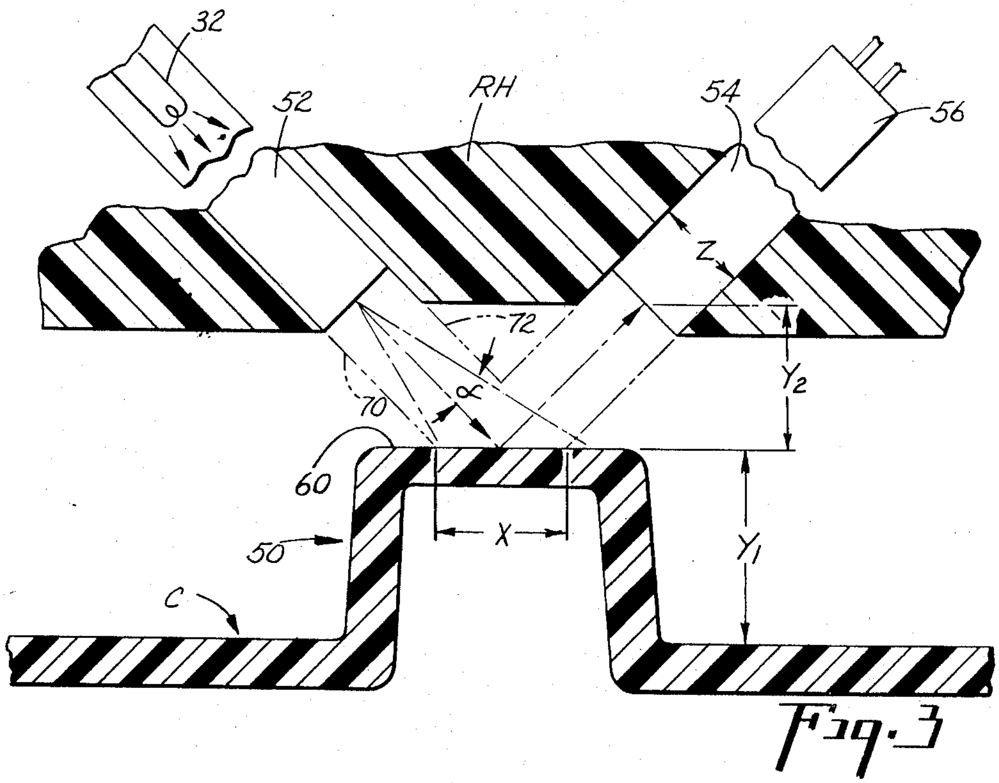
FIG. 3 is a schematic illustration showing the manner in which the present invention may be utilized to detect a raised surface on an information carrying member.

The operation of the invention may be more readily understood with reference to FIG. 3, which illustrates an enlarged portion of card C and a section of read head RH in conjunction with reading information on the card in the form of a raised portion 50. For purposes of illustration, the read head is shown as including only a single transmitting fiber optic tube 52 of array 22 and a single receiving fiber optic tube 54 of array 24. Tubes 52 and 54 are each angled at approximately 45° relative to the lower surface 21 of support 20. Read head RH is positioned in close proximity to card C so that the lower surface 21 of support 20 is substantially parallel to the upper surface of card C. Light received by the receiving tube 54 is conveyed through the tube to the opposite end thereof and applied to the light receiving surface of a photosensing means, such as a phototransistor 56 which, in a conventional manner, serves to provide an output signal having a magnitude in dependence upon the instantaneous amount of light received.

Since the transmitting tube 52 and the receiving tube 54 are of the same size and shape and are located equidistant and equiangular from the upper surface 60 of the embossed character being read, all transmitted light that falls outside of parallel lines 70 and 72 will not be reflected into the receiving tube 54. The light transmitted by transmitting tube 52 within lines 70 and 72 impinges upon the upper surface 60 of the embossed character 50 over a surface area designated by the distance X, as shown in FIG. 3. The bulk of the reflected light from this surface area is receiveed by tube 54, and phototransistor 56 will provide an output signal indicative thereof. The read head is spaced from the surface of the card C by a distance such that specular reflection from an unraised portion of the upper surface of card C will not be received by tube 54 in sufficient amounts to produce an output signal from phototransistor 56.

Figure 4:
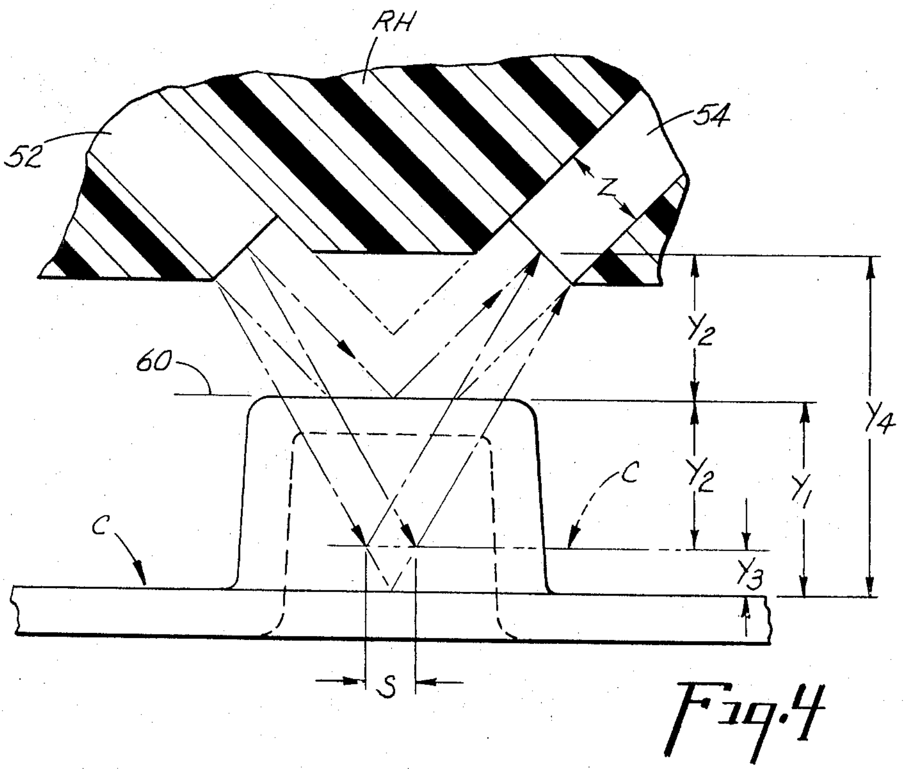
FIG. 4 is a schematic illustration similar to that shown in FIG. 3 showing the positioning of the read head relative to an information carrying member.

Reference is now made to the illustration in FIG. 4. It will be noted that if the distance between read head RH and the upper surface 60 of the embossed character be considered as $Y_2$, and if the upper surface of card C be displaced downwardly therefrom by the same distance $Y_2$, then an overlap area S will exist. At that height, specular light reflected from the upper surface 10 of card C within area S may be received by the receiving tube 54. This condition may be eliminated if tubes 52 and 54 are brought closer together and the read head is lowered to thereby prevent area S from falling on a surface portion of the card. For purposes of illustration, in FIG. 4, the card surface has been displaced downwardly from the card surface 60 by an additional distance $Y_3$. Distance $Y_2$, between the upper surface of the raised character and the read head, should be substantially less than distance $Y_1$ to prevent specular reflection from being sensed by tube 54. These distances will vary in dependence upon such factors as the width or size Z of tubes 52 and 54 and the height $Y_1$ of the raised character portion 50, as well as the numerical aperture of the transmitting and receiving tubes 52 and 54. For example, if the numerical aperture of the tubes 52 and 54 is 0.2, then the sine of angle $\alpha$ shown in FIG. 3, is 0.2. On this basis, and considering a monitored area X being 0.010 inches wide, then distance $Y_1$, the height of character 50, should be no less than 0.014 inches and the distance $Y_2$ may be on the order of 0.01 inches. Consequently, read head RH is positioned above the top of the embossed character such that distance $Y_4$ is on the order of 0.024 inches or greater.

Whereas the invention has been described with respect to an optical reader for flat cards, it is to be appreciated that the invention may be applied to reading information carried on the upper surface of various types of information carrying members which need not be flat so long as they are provided with a normally uniform level surface with information being carried thereon as raised surface areas thereof.

What is claimed is:

1. An information recognition system for sensing information embossed on the surface of an information carrying member, comprising:

a bed for supporting an information carrying member;

a read head mounted adjacent to said bed;

means for causing relative movement between a member carried on said bed and said read head;

light transmitting means included in said read head for carrying light along an acute angle relative to a line on said bed transverse to the direction of relative movement between said read head and said bed so as to illuminate a portion of said bed;

light receiving means included in said read head for carrying light along an acute angle relative to said line on said bed so as to receive light reflected from a point a predetermined distance above said bed;

said predetermined distance from which light is reflected and received by said light receiving means being substantially equal to the greatest thickness of said information carrying member including the thickness of embossed information; and said acute angle relative to a line on said bed transverse to the direction of relative movement between said read head and said bed at which said light transmitting means carries light being substantially equal to said acute angle at which said light receiving means carries light.

2. An information recognition system as set forth in claim 1 wherein said light transmitting means and said light receiving means are positioned so as to be spaced from the information embossed on said information carrying member by a distance substantially less than the height of the said information embossed thereon.

3. An information recognition system as set forth in claim 1 wherein said light receiving means includes fiber optic means having an information member facing end positioned for conveying light received to an opposite end.

4. An information recognition system as set forth in claim 3 including photosensitive means for receiving light from the opposite end of said fiber optic means to provide an output signal in accordance therewith.

5. An information recognition system as set forth in claim 3 wherein said light transmitting means includes a light source and fiber optic means having one end for receiving light from said source and conveying said light to an information carrying member facing end to project light toward said information carrying member.

* * * * *